No. 625,564. Patented May 23, 1899.
E. D. KENDALL.
PROCESS OF TREATING GOLD OR SILVER ORES AND COMPOSITION OF MATTER FOR SAME PURPOSE.
(Application filed May 12, 1898.)
(No Model.)
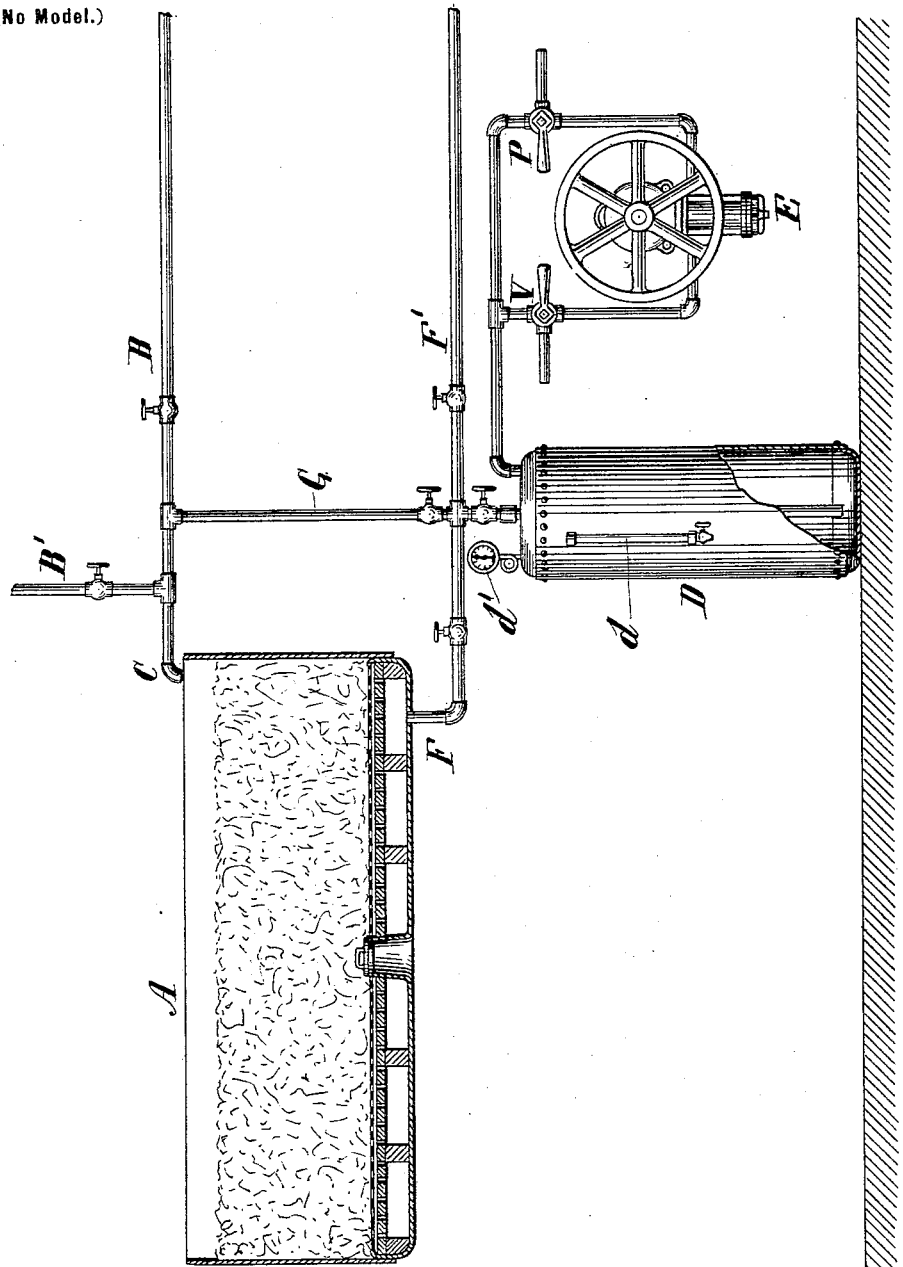
WITNESSES:
D. N. Hayward
Geo. E. Cruse
INVENTOR
E. D. Kendall.
BY
E N Dickerson
HIS ATTORNEY

UNITED STATES PATENT OFFICE.

EDWARD D. KENDALL, OF NEW YORK, N. Y., ASSIGNOR TO HIMSELF AND EDWARD N. DICKERSON, OF SAME PLACE.

PROCESS OF TREATING GOLD OR SILVER ORES AND COMPOSITION OF MATTER FOR SAME PURPOSE.

SPECIFICATION forming part of Letters Patent No. 625,564, dated May 23, 1899.

Application filed May 12, 1898. Serial No. 680,453. (No specimens.)

*To all whom it may concern:*

Be it known that I, EDWARD D. KENDALL, of the city of New York, borough of Brooklyn, in the county of Kings and State of New York, have invented a new and useful Improvement in Methods or Processes of Treating Gold or Silver Ores and a Composition of Matter for the Same Purpose, of which the following is a full, true, and exact description.

In carrying out my invention I prepare the ores by mechanical reduction, the degree of which depends upon the nature of the ore to be treated. I then convey the ore into a suitable lixiviation-vat and there subject it to the action of my chemical composition, which I prepare as follows: I dissolve a suitable thiocyanate—for example, ammonium thiocyanate—in water. I make another solution in water of a suitable ferricyanid—for example, potassium ferricyanid. These two solutions I usually keep apart until I am about to treat the ore, when I mix them in suitable proportions and with this compound chemical solution leach the ore. I do not confine myself to particular proportions of the chemical constituents of my composition nor to particular strengths of solutions. These will vary with the physical and chemical character of the ores to be treated, the values contained therein, the temperatures, the lengths of time during which the ores are to be subjected to chemical action, the degree of pulverization, or other conditions. My chemical composition acts in the same way whether dilute or more concentrated, but with differences of energy. I use weak solutions with ores of low grade, particularly such as yield their precious metals readily, and stronger solutions with richer or more refractory ores. In four hundred and fifty pounds of water I may put five pounds of ammonium thiocyanate and add to this solution fifty pounds of water containing one pound of potassium ferricyanid. The constituents of my composition may be brought together in any required order. Either thiocyanate or ferricyanid may be added in dry condition to the pulverized ore and the solution of the other chemical added, or both chemicals may be put into the ore in the dry state and water added. My composition may be used cold or with the application of heat to the liquid or to the ore and with or without mechanical agitation. The reactions which take place during the treatment of the ores by this process seem to be of complex character and therefore cannot be set forth in this specification.

Any ordinary form of lixiviation-vat may be used in treating ores by my herein-described process. At mines where there is a scarcity of water and when treating comparatively rich ores or concentrates in vats of moderate capacity I prefer to draw off the lixivium quickly from the ores and also the water used for washing the ores by connecting the space between the bottom and the false bottom or filter of the lixiviation-vat with the interior of a closed receptacle, in which a partial vacuum may be created with an air-pump or other means. The advantages of such an arrangement are that a comparatively small volume of water will suffice to wash the last portions of the composition containing gold and silver from the ore, and thus save time.

The accompanying drawing, which is part in section and part in elevation, represents part of an apparatus or plant for carrying out my invention, which constitutes the modification above referred to.

In the drawing, A indicates a leaching-vat of usual form charged with pulverized ore.

B is a pipe or conduit which conducts a solution of thiocyanate.

B' is a pipe or conduit conducting a solution of ferricyanid and connecting with the pipe B, so that the commingled solutions may be discharged into the leaching-vat through the outlet-pipe C.

D indicates a closed tank, attached to which is a gage $d$ for showing height of liquid within the tank, and at the top thereof a gage $d'$ is placed, which indicates in degrees either a vacuum or pressure within the tank. A safety-valve may be attached to the tank when required.

E is an air-pump having pipe connection with the closed tank D, so that by suitable adjustment of the three-way cocks V and P either a partial vacuum may be created within the tank or air may be compressed therein.

F represents a pipe which conveys the lixivium from the bottom of the leaching-vat A into the closed tank D (when a partial vacuum is created within the tank) or to the pipe F', which is a continuation of the pipe F, and which pipe conducts the lixivium to electrolytic tanks or other suitable apparatus (not shown) for separating the contained precious metals.

G represents a pipe forming a communication from the tank D to the pipe B. The purpose of this pipe is, after the lixivium has been drawn from the leaching-vat A into the tank D by the vacuum therein, to conduct this lixivium when it is forced out of the tank by air-pressure therein back to the pipe B, so that the liquid may again be discharged onto the ore within the leaching-vat either with or without the addition of the thiocyanate solution from the pipe B or ferricyanid solution from the pipe B', each of which pipes is connected with its appropriate reservoir of prepared solution.

When the ore has been sufficiently treated by the chemical solution, the lixivium may be allowed to drain off through the pipe F and its continuation F', or it may be drawn off by vacuum into the closed tank D and afterward forced by air-pressure from the tank into the pipe F', which conducts it to an appropriate apparatus where the precious metals may be obtained from the lixivium by electrolysis or other suitable means.

What I claim as my invention, and desire to secure by Letters Patent, is—

1. The herein-described process of treating ores or other bodies for the extraction of precious metals, which consists in treating them with an aqueous solution containing a thiocyanate and a ferricyanid, substantially as described.

2. The herein-described composition of matter, to be used for extracting precious metals from ores, tailings, or other bodies, consisting of a suitable thiocyanate and a suitable ferricyanid in watery solution, substantially as described.

In testimony whereof I have signed my name to this specification in the presence of two subscribing witnesses.

EDWARD D. KENDALL.

Witnesses:
 H. COUTANT,
 D. W. MAXON.